(No Model.) 2 Sheets—Sheet 2.

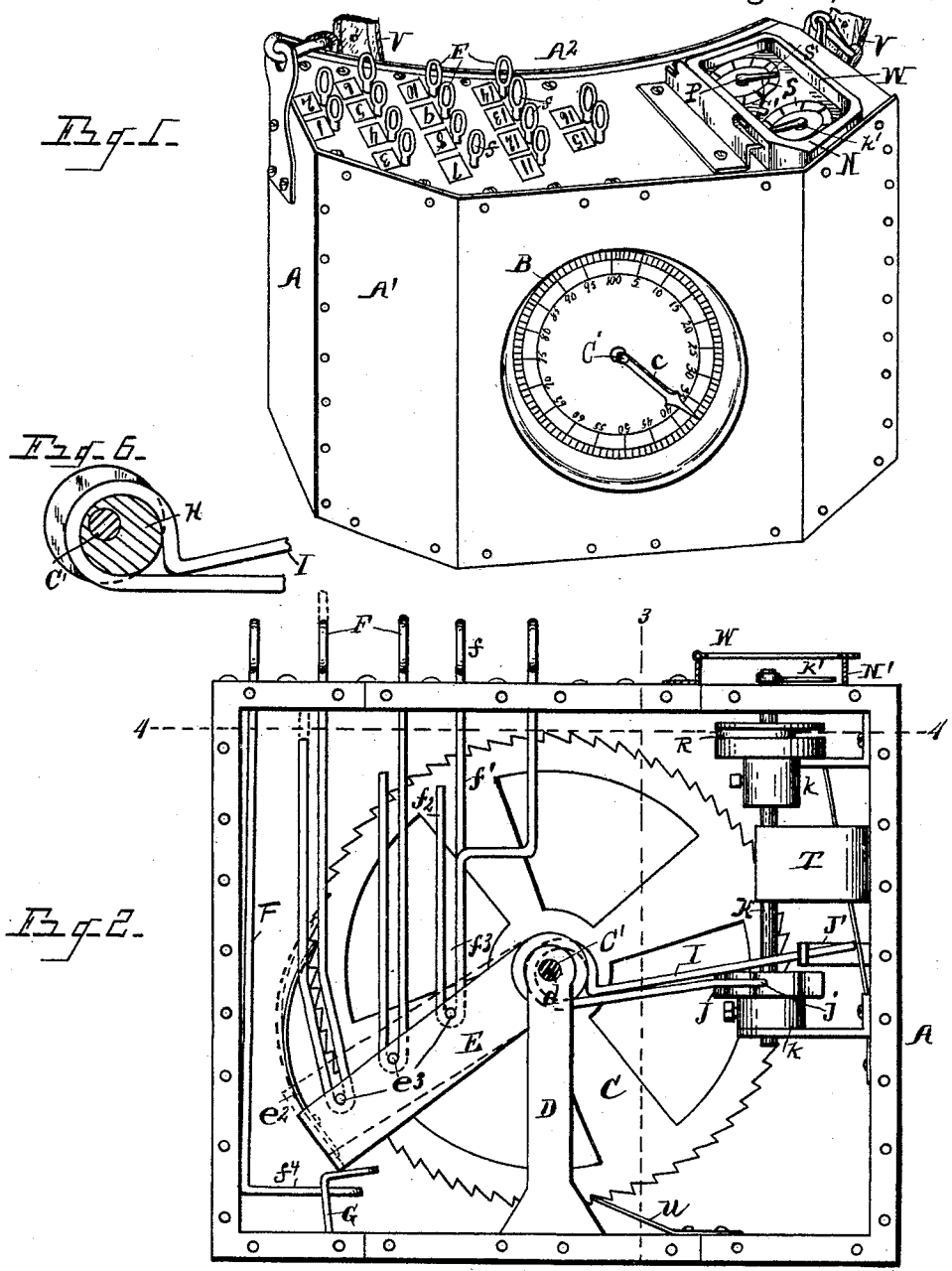

W. H. EMERSON.
LUMBER REGISTER.

No. 525,008. Patented Aug. 28, 1894.

WITNESSES
Otto B. Baenziger.
M. A. Martin.

INVENTOR
William H. Emerson
By his Attorney
Newell S. Wright

UNITED STATES PATENT OFFICE.

WILLIAM H. EMERSON, OF CHATHAM, CANADA.

LUMBER-REGISTER.

SPECIFICATION forming part of Letters Patent No. 525,008, dated August 28, 1894.

Application filed December 26, 1893. Serial No. 494,631. (No model.)

*To all whom it may concern:*

Be it known that I, WILLIAM H. EMERSON, a subject of the Queen of Great Britain, residing at Chatham, county of Kent, Province of Ontario, Canada, have invented a certain new and useful Improvement in Lumber-Registers; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a lumber register, and has for its object a device of this class whereby to register the measurements of lumber, the register being simple and economical in construction, while at the same time it is ready and effective in its operation.

My invention consists of the construction, combination and arrangements of devices and appliances hereinafter specified and claimed, and illustrated in the accompanying drawings, in which—

Figure 4:
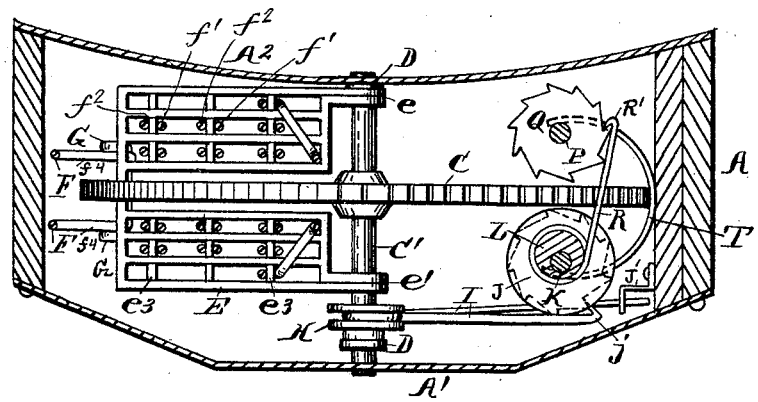
Figure 3:
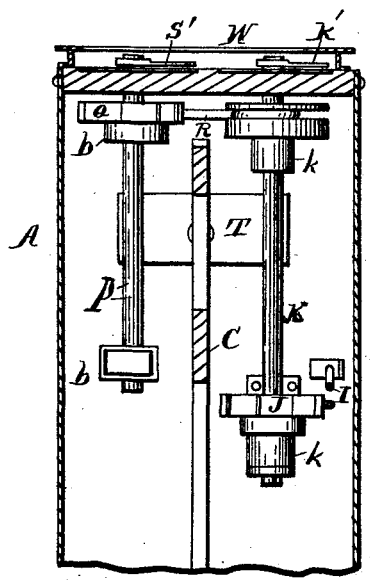
Figure 2:
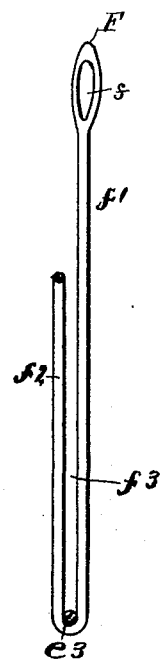

Figure 1 is a view in perspective. Fig. 2 is a side elevation, with the front portion of the case and dial removed. Fig. 3 is a vertical section on the line 3—3 of Fig. 2, a portion being broken away. Fig. 4 is a horizontal section on the line 4—4 of Fig. 2, showing the interior mechanism in plan. Fig. 5 is a detail view of one of the keys F, and showing its engagement with the rod $e^3$. Fig. 6 is a vertical section through the eccentric H.

The desirability of a register for the purpose above mentioned, is readily understood.

I carry out my invention as follows:

A represents the case of the register, A' representing the front portion of the case, and B a dial located thereupon. Within the case I locate a registering wheel C toothed upon its periphery, the periphery of said wheel bearing, preferably, one-hundred teeth, although I do not limit myself to any specific number. This registering wheel is journaled in suitable bearings D, as shown at "$d$." The dial B is preferably numbered from one to one-hundred to correspond with the teeth on the periphery of the wheel C. The journal C' of the wheel C is provided with an indicator finger "$c$" traversing the face of the dial.

E represents a swinging or oscillatory frame journaled upon the shaft C', as shown at "$e$," $e'$. This frame extends radially beyond the periphery of the registering wheel C and is provided with a pawl $e^2$ to engage the tooth periphery of said registering wheel when the frame is lifted.

The first part of my invention relates to the combination of a number of keys, in connection with the dial, registering wheel and swinging frame above described, so constructed and arranged that when one of the keys is operated, the indicator finger "$c$" will traverse the dial B and accurately register thereupon the number that the said key represents. Each of the keys, it will be understood, represents a desired number expressing the contents in feet of a board or plank measured.

Accordingly, F represents a series of such keys, the series being of any desired number. These keys extend through the top plate of the case A and are preferably formed into an eye or loop at their upper ends, respectively, as shown at "$f$," for greater convenience of operation. The opposite ends of the keys are constructed and arranged, preferably, to pass around or under a suitable rod $e^3$ upon the frame, thence passing upward parallel with the main stem $f'$, as shown at $f^2$, forming a loop at $f^3$ within which is extended the corresponding rod $e^3$ of the frame. The upper end of the portion $f^2$ of the key forms a stop for the key when lifted against the top of the case, to limit the upper stroke of the key and consequently the throw of the frame E and its pawl $e^2$, and consequently the throw of the registering wheel C thereby. This is readily accomplished by constructing the stop portion $f^2$ of the key of required length. I do not, however, limit myself to any particular manner of engaging the keys with the said frame to lift the frame and its pawl. As shown, the two outer keys at the left hand of Figs. 2 and 4, may simply project downward and in under the frame, as indicated at $f^4$, any suitable means being employed to limit the throw of said outer keys, and thereby the throw of the wheel C. The construction of the keys with the open loops $f^3$, it will be observed, permits the frame to be lifted by any desired key without disturbing any other key of the series, inasmuch as the rods $e^3$ corresponding to the other keys, will simply ride upward in the open slots $f^3$ thereof when the frame E is lifted by any given key of the series.

Any suitable stop G may be provided to limit the downward stroke of the frame E. It will thus be perceived that as the different keys F are manipulated, they will correspondingly register the measure desired to be indicated upon the dial B.

Another part of my invention relates to a further combination with the parts already described, of other registering mechanism, consisting of two additional dials whereby to register hundreds and thousands of feet at the same time that the dial B is registering from one to one hundred.

Accordingly, as shown in the drawings, J represents a ratchet wheel mounted upon a shaft K, provided with suitable bearings "$k$" engaged upon the case. Upon the journal C' is located an eccentric H. Around said eccentric passes an eccentric rod "I" constructed with two arms, one of which engages the ratchet wheel J, as shown at "$j$," the other end being engaged with a bracket J' for the purpose of retaining the eccentric rod in position. The ratchet wheel J is engaged with the shaft K toward the lower end thereof and is provided preferably with ten teeth upon its periphery, each tooth representing one hundred. Upon the upper surface of the register casing is provided another dial N. The shaft K is provided with an index finger $k'$ traversing the dial N. This dial N corresponds to the ratchet wheel J in its numerals, and will thus register from one hundred to ten hundred inclusive. It will be observed from the construction described, that the ratchet wheel J is moved one notch at each rotation of the wheel C.

To register thousands of feet, I provide an additional shaft P journaled in suitable bearings "$b$," provided toward its upper end with a ratchet wheel Q. Toward the upper end of the shaft K is located an eccentric L. About the eccentric L is engaged rod R, one extremity thereof forming a pawl R' engaging the ratchet wheel Q which is turned one notch at each revolution of the eccentric L. The register is provided upon its upper surface with an additional dial S. The shaft P passes through the case and is provided at its upper end with an index finger S'. The dial S is preferably constructed to register from one thousand to ten thousand inclusive, although I do not limit myself thereto. A friction spring T bears upon the shafts K and P to prevent said shafts being turned in the wrong direction. A spring dog $u$ prevents the wheel C from rotating in the wrong direction. The operation of the device will now be understood. I prefer that the inner portion of the case should be concaved as shown at $A^2$, that the case may more snugly fit the person of the party measuring. Straps V, or analogous means may be employed to secure the register upon the person. Over the dials N and S may be provided a suitable cover W.

In order to place the machine at its starting point, the operator may manipulate the keys F until the index finger $c$ is brought to the 100 point at the top of the dial C. The hands on the other dials are placed at zero by means of a key upon top of the shafts P and K.

What I claim as my invention is—

1. A register having in combination a case, a primary registering wheel, a swinging frame arranged to operate said wheel, and keys to operate the frame, said frame provided with rods, and said keys constructed respectively with an elongated recess in which said rods of the frame are engaged, substantially as set forth.

2. A register having in combination a case, a registering wheel, a swinging frame arranged to operate said wheel, and keys constructed with arms $f'$, $f^2$, forming an elongated recess therebetween to engage said frame, the extremity of one of said arms forming a stop to limit the movement of the key, substantially as set forth.

3. A register having in combination a case, a primary registering wheel, a swinging frame extending radially beyond said wheel to operate said wheel, keys to operate said frame, a second registering wheel, an eccentric upon the shaft of the primary wheel, a pawl operated by said eccentric actuating the second registering wheel, means to prevent a reverse movement of said registering wheels, dials corresponding to said registering wheels, and indexing fingers operated by said registering wheels and traversing said dials, substantially as set forth.

In testimony whereof I sign this specification in the presence of two witnesses.

WILLIAM H. EMERSON.

Witnesses:
THOS. SCULLARD,
WM. A. CAMPBELL.